United States Patent [19]
Zettler

[11] Patent Number: 5,600,190
[45] Date of Patent: Feb. 4, 1997

[54] MICROMECHANICAL COMPONENT PART AND METHOD FOR THE MANUFACTURE THEREOF

[75] Inventor: Thomas Zettler, Munich, Germany

[73] Assignee: Siemens Aktiengesellschaft, Munich, Germany

[21] Appl. No.: 242,336

[22] Filed: May 13, 1994

[30] Foreign Application Priority Data

May 19, 1993 [DE] Germany .................... 43 16 856.6

[51] Int. Cl.⁶ .................... H02N 1/00; H01L 21/306
[52] U.S. Cl. .................... 310/40 MM; 156/657.1; 310/309
[58] Field of Search .................... 310/40 MM, 42, 310/309; 156/633.1, 634.1, 657.1, 662.1, 631.1; 428/209, 210, 704

[56] References Cited

U.S. PATENT DOCUMENTS

| | | | |
|---|---|---|---|
| 5,399,415 | 3/1995 | Chen et al. | 428/209 |
| 5,472,539 | 12/1995 | Saia et al. | 156/155 |
| 5,493,156 | 2/1996 | Okada | 310/40 MM |

FOREIGN PATENT DOCUMENTS 0403179  12/1990  European Pat. Off. .

OTHER PUBLICATIONS

Kenichiro Suzuki, Single Crystal Silicon Micro–Actuators, IEEE International Electron Devices Meeting: San Francisco, CA, Dec. 9–12, 1990, New York, pp. 2641-2644.

Chen et al., A Selective CVD Tungsten Process for Micromotors, TRANSDUCERS, 1991, Int. Conf. on Solid–State Sensors and Actuators. San Francisco, IEEE Cat. No. 91CH2817-5, pp. 739 – 742 month unknown.

Mehregany et al., Surface Micromachined Mechanisms and Micromotors, J. Micromech. Microeng., 1991, vol. 1, pp. 73 – 85 month unknown.

Tavrow et al., Operational Characteristics of Microfabricated Electric Motors, Sensors and Actuators, 1992, pp. 33 – 44 month unknown.

Bley et al., Description of Microstructures in Liga–Technology, Microelectronic engineering 13, 1991, pp. 509 – 512 month unknown.

Primary Examiner—Thomas M. Dougherty
Assistant Examiner—Judson H. Jones
Attorney, Agent, or Firm—Hill, Steadman & Simpson

[57] ABSTRACT

A micromechanical component, for example a motor, wherein micromechanical structures such as a rotor, rotational axle, and stator, are manufactured of the same layer or multiple layer of, for example, CVD tungsten deposited in corresponding trenches. As a result thereof, no alignment problems arise. The static micromechanical structures are connected to the underlying substrate with electrical and/or mechanical connecting means, whereby retaining the movable micromechanical structure to a substrate can be simultaneously achieved. The manufacturing process is compatible with the production of integrated circuits on silicon and requires only three photolevels.

7 Claims, 2 Drawing Sheets

MICROMECHANICAL COMPONENT PART AND METHOD FOR THE MANUFACTURE THEREOF

BACKGROUND OF THE INVENTION

The invention is directed to a micromechanical component part having a static micromechanical structure and a movable micromechanical structure; and to a method for the manufacture thereof.

There currently exists a great interest in processes that are compatible with the fabrication of integrated circuits, particularly of silicon, in the manufacture of micromechanical component parts for employment as actuators or sensors. A compatibility of manufacturing processes allows integration of micromechanics and drive circuits in microsystems. This is also important when existing semiconductor manufacturing systems are to be simultaneously utilized for the manufacture of micromechanical structures. Micromechanical component parts whose function is based on electrostatic attractive forces, such as between capacitor surfaces with variable spacing, are particularly suited for such microsystems, since a suitable combination of conductive and non-conductive layers, that are also utilized in integrated circuits, is thereby fundamentally adequate.

Such micromechanical component parts are composed of static and movable micromechanical structures; a typical applied example thereof is a motor (with rotational axle and stator as static and, respectively, with rotor as movable micromechanical structure) or a gearing (with rotational axle or, respectively, rotor).

The following problems must be solved in the manufacture of, for example, a motor:

Since the electrostatic forces decrease with increasing spacing, optimally small spacings between rotor and stator are desirable. This and the general mechanical tolerance demands require slight adjustment tolerances of the appertaining photo levels. Further, high-resolution lithography is important. Deriving therefrom as a further demand is an optimally far-reaching planarity of the surfaces during the manufacturing process. This is also of significance for the following process steps. Since the electrostatic forces and the torque of a micromotor increase with the area, the manufacturing process should allow an optimally great thickness of rotor and stator in the direction of the rotational axle (in a gearing without electrical connection, too, a large layer thickness is desirable in order to assure mechanical stability). A low specific resistance of the conductive material is also important for the low-loss function of the motor. In general, a process should be optimally simple and require few photo levels.

Among others, the following manufacturing processes are known:

a) Polysilicon Center-Pin Process (M. Mehrengany et al., J. Micromech. Microeng., Vol. 1, 73, 1991).

In the manufacture of the micromechanical structures, this process requires additional polysilicon depositions after the metallization complex following the manufacture of the integrated circuit. If the center-pin process is to be implemented before the metallization of the integrated circuit, the problem of etching the movable structures free arises and the problem of protecting the insulation of the metallization simultaneously arises. Four photolevels are required. The high topography steps over which the third and fourth mask level must be produced as well as the employment of doped polysilicon that comprises a specific resistance of approximately 2 m$\Omega$ cm and a practically realizable layer thickness of less than 5 µm, are disadvantageous.

b) Polysilicon Flange Process (M. Mehrengany, Y.—C. Tai, J. Micromech. Microeng., Vol. 1, 73, 1991).

This process is similar to process a), whereby, moreover, the second mask level must be produced over a topography step.

c) Polysilicon LOCOS Process (L. S. Tavrow et al, Sensors and Actuators A, 35 (1992) Page 33).

This process provides that the movable micromechanical structures be produced on a planar LOCOS oxide layer, whereby the oxidation step can only ensure before the transistor manufacture because of the temperature stress. Given a complete implementation of the process before the manufacture of the integrated circuit, an unfavorable topology for the following steps derives, as does the problem of protecting the micromechanical elements during the manufacture of the integrated circuit. Given manufacture meshed with one another, the problem of etching the rotor free given simultaneous protection of the circuit's insulating oxides must be resolved. A further disadvantage is the employment of six mask levels, some of these having to be generated over high topography steps.

d) Selective Tungsten Process (L. Y. Chen, N. C. MacDonald, TRANSDUCERS '91, International Conference on Solid-State Sensors and Actuators, San Francisco, 24–27 June 1991, IEEE Catalog No. 91CH2817-5, 739, 1991).

This process can be implemented following a circuit fabrication process, whereby the problem of contacting the motor and of protecting the metallization insulation is not resolved by the proposed method. Rotor and stator are in fact produced in the same mask level and the rotational axle is produced self-aligned relative thereto; the process, however, requires five mask levels, the third, fourth and fifth thereof having to be produced over high topography steps. High layer thicknesses of a highly conductive material can be produced by the deposition of tungsten in trenches.

SUMMARY OF THE INVENTION

The object of the invention is to create a micromechanical component part having high mechanical or, respectively, electrical loadability and reliability, as well as to specify a manufacturing method that is simple and is fully compatible with the fabrication of integrated circuits.

The invention is based thereon that movable and static micromechanical structures be produced of the same layer or multiple layer, i.e. for example in a motor, the rotational axle as well. The static structures are then connected to a substrate with the assistance of mechanical and/or electrical connecting means, whereby the connecting means are formed of a further layer (referred to as fixing layer). Both the position of the micromechanical structures as well as the connecting means are defined by a single photomask. Depressions (trenches) are etched into a layer, particularly an insulating layer applied on the substrate being etched with this (first) photomask, whereby the micromechanical structures are produced in the trenches and some of the ridges remaining between the trenches partially serve as space-reserving ridges for the connecting means to be produced in a later method step.

The space-reserving ridges are removed at prescribed locations with the assistance of a second photomask whose adjustment is not critical, whereby the etching process preferably uncovers the substrates. The second photomask thus defines the exact position of the connecting means within the space-reserving ridges. Dependent on the type of intended connection (for example, only a mechanical connection) and on the layers applied onto the substrate, the etching process can also be stopped earlier (shallower), for example at a layer applied on the substrate.

The holes that have arisen with the etching process are filled with the fixing layer. If the fixing layer is to be applied surface-wide, a third photomask is required for the structuring thereof. In this case, the structuring can ensue such that the movable structures are retained by the fixing layer to the substrate at the same time.

The process is suitable for the manufacture of any desired micromechanical component parts having static and movable micromechanical structures, i.e. for example, motors, gearings and linearly movable structures. The connecting means can be provided at any desired location, i.e. at the edge of a static structure as well. When an electrical connection is to be produced, a corresponding space-reserving ridge is produced over a contact region in the substrate with the assistance of the first photomask, whereby the adjustment must assure an adequate electrical contacting area.

The micromechanical structures and connecting means can be produced of a material matched to the intended employment and compatible with silicon technology. In particular, a tungsten deposited in a CVD method is suitable as a material for a motor, namely for the rotor, stator and rotational axle, since it has good conductivity and can be deposited with a great thickness and conformably. It is therefore also preferably employed as fixing layer, whereby a selective deposition can also be implemented.

The invention shall be set forth in greater detail below with reference to an exemplary embodiment shown in the figures.

DETAILED DESCRIPTION OF THE PREFERRED EMBODIMENTS

Figure 1:
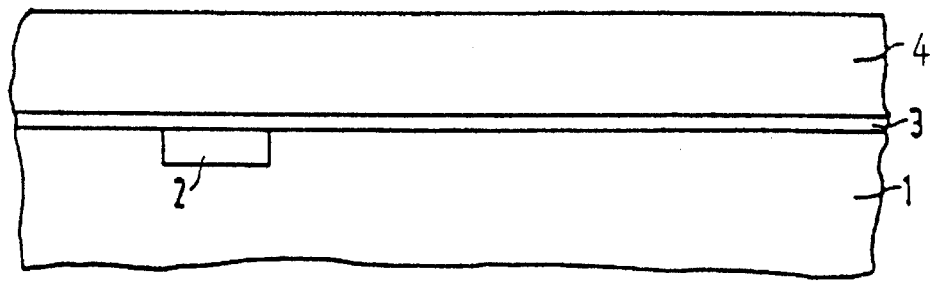
FIGS. 1 through 5 show in progression the manufacturing method of the invention on the basis of a cross section through a substrate with reference to the example of a micromechanical motor.

According to this exemplary embodiment as shown in FIG. 1, a lower insulating layer 3 of silicon nitride (approximately 60 nm) and an upper insulating layer 4 of silicon oxide (for example, BPSG, approximately 2500 nm) are applied onto a substrate 1 that can already contain finished structures or circuits and comprises a contact region 2 at its surface. The upper insulating layer 4, for example, has a largely planar surface as a result of a polishing process (Chemical Mechanical Processing, CMP); preferably, the substrate 1 is likewise already planarized by a polishing process or by some other process.

Figure 2:
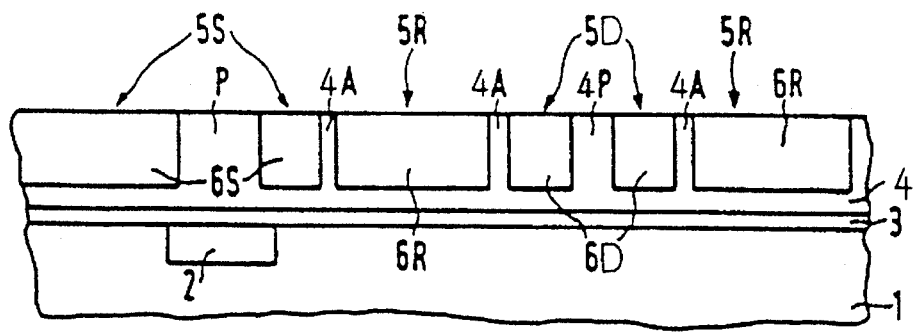

As illustrated in FIG. 2 with a first photomask (not shown), trenches 5 are etched into the upper insulating layer 4, these serving the purpose of accepting the static and movable micromechanical structures. Trenches 5S for the stator, 5R for the rotor and 5D for the rotational axle are thereby provided, whereby the trenches for rotor and rotational axle proceed essentially annularly and concentrically.

The trench 5D for the rotational axle comprises a ridge 4P in its inside (not necessarily centrally-symmetrically) that serves as a space-reserving means for a connecting means to be produced later for connecting the rotational axle to the substrate. The trench 5S for the stator comprises a corresponding space-reserving ridge 4P that is arranged above the contact region 2. This space-reserving ridge can also be omitted when the stator is to be joined to the substrate at its edge (the hole yet to be explained for the connecting means is then subsequently etched at the stator edge).

Ridges 4A that define the spacings between the corresponding structures are located between the trench 5R for the rotor on the one hand and the trenches 5S, 5D for stator or rotational axle on the other hand. These ridges are preferably optimally narrow (dependent on lithography and etching processes).

After the removal of the lacquer mask, a material for the micromechanical structures, preferably CVD tungsten with underlying adhesion layer of titanium/titanium nitride which fills the trenches is deposited surface-wide. The removal of the excess material can ensue on the basis of a polishing process (CMP) or by anisotropic re-etching. In the case of anisotropic re-etching (without auxiliary masks), the smaller expanse of the trench dare be no greater than approximately twice the trench depth. When larger tungsten areas are nonetheless to be produced, then these must be resolved net-like.

After the removal of the excess material, stator 6S, rotor 6R and rotational axle 6D are finished, whereby the rotational axle and, potentially, the stator as well are fashioned as hollow members for the acceptance of the connecting means.

Figure 3:
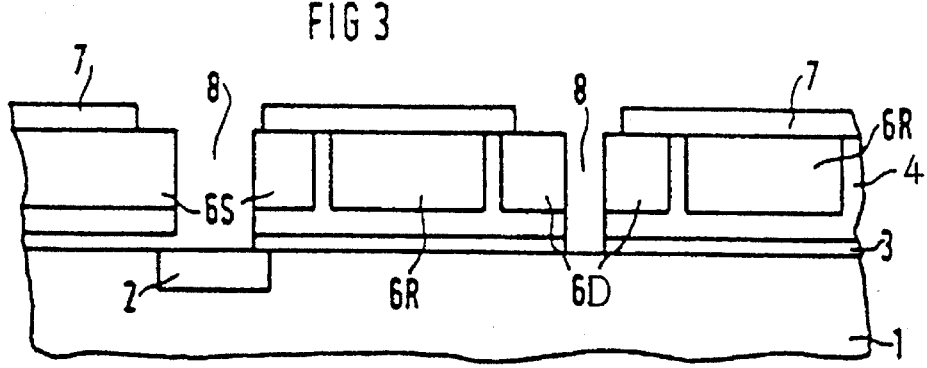

FIG. 3 illustrates an intermediate layer 7 of, preferably, silicon oxide (for example, BPSG having a thickness of approximately 100 nm) applied surface-wide. At least the ridges 4A are covered with a second photomask (not shown) on the intermediate layer 7, whereby the space-reserving ridges 4P remain uncovered over an adequately large area, preferably entirely uncovered. In view of a good mechanical and electrical connection, it is advantageous when the lacquer mask also leaves parts of the stator 6S and rotational axle 6D free.

Holes 8 are etched into the intermediate layer 7 and into the space-reserving ridges 4P with the second photomask; an anisotropic etching process selective relative to tungsten is utilized, so that the surfaces of stator and rotational axle are partially uncovered. The silicon oxide layer 4 and the silicon nitride layer 3 lying therebelow are etched down to the substrate 1 or, respectively, down to the contact region 2.

Figure 4:
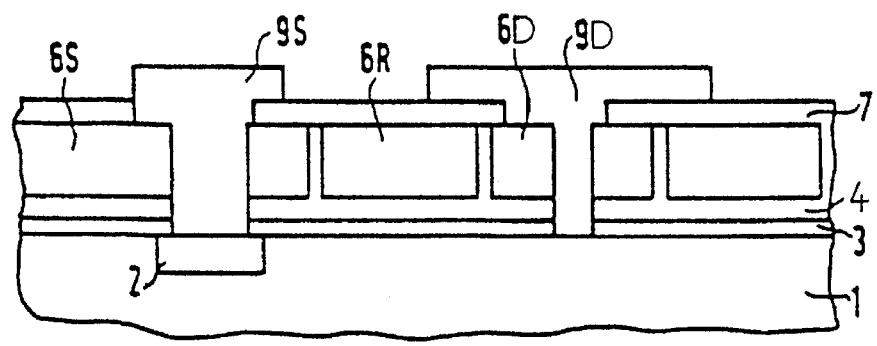

As shown in FIG. 4, by deposition of a fixing layer 9, the holes that have arisen are filled at least up to the upper edge of the intermediate layer 7. Tungsten (potentially with an adhesion layer lying therebelow) is preferably deposited surface-wide as fixing layer and is then structured with a third lacquer mask (not shown) to form connecting means 9S, 9D with which the stator S and rotational axle 6D are electrically or, respectively, mechanically connected to the contact region 2 and to the substrate 1. A part of the structured fixing layer (9S or, preferably, 9D for the purpose of avoiding shorts) thereby partially covers the rotor 6R.

Figure 5:
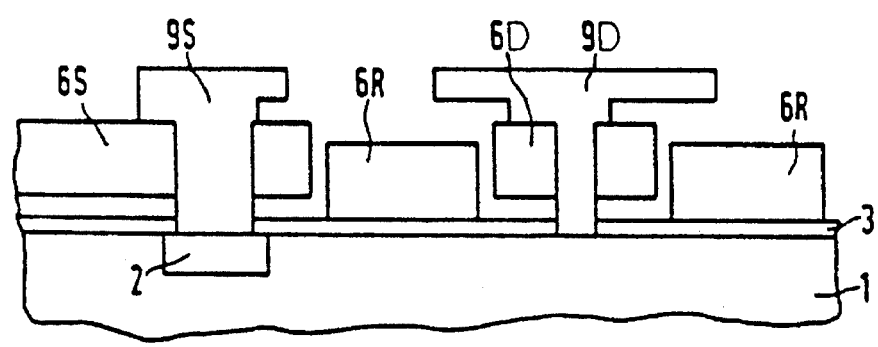

FIG. 5 illustrates that after the removal of the lacquer mask, the intermediate layer 7 and the upper insulating layer 4 are selectively etched off relative to the lower insulating layer 3; this being possible in a simple way wet-chemically given the recited materials. The rotor 6R is thereby uncovered and becomes movable, whereas stator 6S and rotational axle 6D remain anchored at least via the connecting means 9S, 9D in the lower insulating layer 3. Dependent on the duration of the etching process, the upper insulating layer 4 is also not completely removed under the stator structure. As may be seen in the figure, the rotor 6R is protected against falling out by the connecting means 9D.

Figure 6:
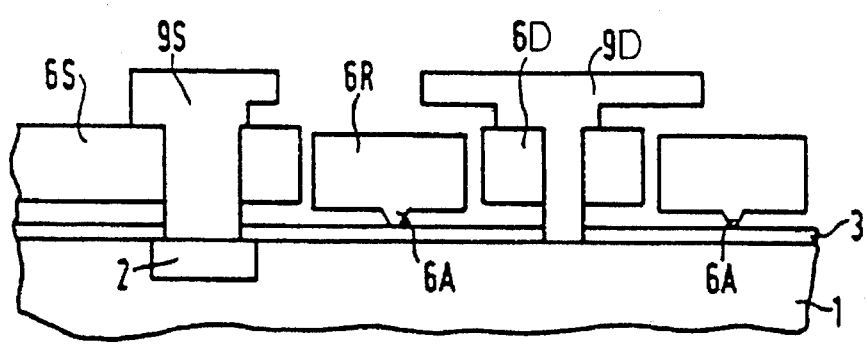
FIG. 6 shows a further exemplary embodiment of a motor of the invention.

FIG. 6 illustrates an embodiment wherein the movable structures, i.e. the rotor 6R, can also be seated on spacers 6A having a small seating area (what are referred to as "bushings", as likewise described in the prior art). To that end, corresponding trenches are structured with an auxiliary mask in the upper insulating layer 4 after deposition of the upper insulating layer 4. These are then lowered farther in the anisotropic etching of the trench 5 and are later filled with tungsten for the formation of the spacers 6A.

In a modification of the exemplary embodiment that has been set forth, the holes for the acceptance of the connecting means can also be etched only up into the lower insulating layer 3 or up to the surface thereof when no electrical connection is provided at the substrate and an adequate mechanical stability of the component part is assured, for example as a result of a large seating surface of the connecting means. On the other hand, it can also be etched into the substrate. Further, the lower insulating layer 3 is not necessary when the etching process for uncovering the movable micromechanical structures ensues selectively relative to the substrate 1 as well as, potentially, relative to the contact region 2 and the required stability of the electrical or, respectively, mechanical connection is assured. Other layers can also be selected instead of the lower and/or upper insulating layer 3, 4 in the region of a purely mechanical part, i.e. without direct electrical connection. The upper layer 4 must thereby be selectively etchable relative to the material of the micromechanical structures 6 and relative to the lower layer 3 or relative to the substrate 1.

A particular advantage of the process is its good compatibility with manufacturing processes for semiconductor circuits. The materials employed and the process steps are known from metallization processes for integrated circuits. The described three-mask process can be implemented directly following a conventional metallization process. The lower insulating layer 3 protects the intermetal oxide during the etching step for uncovering the rotor. The process also solves the problem of contacting micromotors and other micromechanical elements. The contact region 2 produces the connection to the connecting means and, thus, to the static micromechanical structures. In the same way, pad openings of the integrated circuit can be connected from the outside.

The process that has been presented requires no x-ray lithography and assembly as in the LIGA Process (P. Bley et al, Microelectronic Engineering 13, 509, 1991) and requires no additional polysilicon depositions like the processes that were initially set forth. By contrast to all other processes, the protection of the intermetal oxide and the motor contacting can be implemented in a simple way and are part of the process design.

All static and movable micromechanical structures are produced in the same mask level and are therefore exactly aligned. The absence of adjustment tolerances allows the manufacture of micromotors having the smallest possible air gap and having high torque. By contrast to all known processes, all mask levels are produced on a planar surface, so that the resolution of the lithography can be optimally exploited.

Extremely large layer thicknesses (particularly greater than 5 μm) can be realized given employment of (CVD) tungsten, so that, for example, motors having high torque can be manufactured. No photolithographic problems arise despite the high layer thicknesses, since the metal is deposited in trenches and leaves a planar surface. The process allows the employment of extremely conductive material (tungsten, aluminum, other metals) for the micromechanical structures and for the connecting means.

The process can be governed extremely well and far more simply than all known processes; in particular only three photolevels are required. Even given introduction of an auxiliary mask for producing bushings, it is only the same number of masks as in the simplest polysilicon processes that is required.

Although the present invention has been described with reference to a specific embodiment, those of skill in the art will recognize that changes may be made thereto without departing from the scope and spirit of the invention as set forth in the appended claims.

I claim as my invention:

1. A micromechanical arrangement, comprising:

a substrate;

a static micromechanical structure;

a movable micromechanical structure, said static and movable micromechanical structures formed from a layer applied on a top side of the substrate;

means for connecting the static structure to the substrate, said means for connecting formed of a fixing layer deposited into a hole of said static structure and connecting said static structure to said substrate and extending up vertically into said hole of the static structure.

2. The micromechanical arrangement according to claim 1, wherein the movable micromechanical structure is retained onto the substrate by the connecting means.

3. A micromechanical arrangement, comprising:

a substrate:

a static micromechanical structure:

a movable micromechanical structure, said static and movable micromechanical structures formed from a layer applied on a top side of the substrate;

means for connecting the static structure to the substrate, said means for connecting formed of a fixing layer extending up vertically into said hole of the static structure;

wherein the substrate is covered with at least one insulating layer having an essentially planar surface and wherein said means for connecting includes electrically connecting said static structure to said substrate wherein said substrate comprises a contact region for the means for connecting.

4. The micromechanical arrangement according to claim 1, wherein the movable micromechanical structure comprises bushings for seating on the substrate or an insulating layer on the substrate and having a small seating area.

5. A micromechanical arrangement, comprising:

a substrate:

a static micromechanical structure:

a movable micromechanical structure, said static and movable micromechanical structures formed from a layer applied on a top side of the substrate:

means for connecting the static structure to the substrate, said means for connecting formed of a fixing layer extending up vertically from the substrate into the static structure:

wherein the static and movable micromechanical structures and the means for connecting are essentially composed of tungsten.

6. A micromechanical arrangement, comprising:

a substrate:

a static micromechanical structure;

a movable micromechanical structure, said static and movable micromechanical structures formed from a layer applied on a top side of the substrate;

means for connecting the static structure to the substrate, said means for connecting formed of a fixing layer extending up vertically from the substrate into the static structure;

further comprising a rotational axle fashioned as a hollow member, and said static micromechanical structure comprises a stator, and said movable micromechanical structure comprises a rotor, and said means for connecting is formed by a further conductive layer that at least partially covers the surface of the rotational axle and is connected to the substrate through the hollow member and that at least partially covers the surface of the stator and is connected to a contact region in the substrate.

7. A micromechanical arrangement comprising:

a substrate;

a static micromechanical structure:

a movable micromechanical structure, said static and movable micromechanical structures formed from a layer applied on a top side of the substrate;

means for connecting the static structure to the substrate, said means for connecting formed of a fixing layer extending up vertically from the substrate into the static structure;

comprising a gearing, said static structure having a rotational axle fashioned as a hollow member, and said movable structure comprising a rotor; and comprising a layer as fixing layer that at least partially covers the surface of the rotational axle and is connected to the substrate through the hollow member.

* * * * *